US007643473B2

(12) United States Patent
Kalinichenko et al.

(10) Patent No.: US 7,643,473 B2
(45) Date of Patent: Jan. 5, 2010

(54) INSTANT MESSAGING WITH AUDIO CONNECTION FORMATION

(75) Inventors: Alexey Kalinichenko, Redmond, WA (US); Ben D Garrison, Redmond, WA (US); Erik L DeBonte, Redmond, WA (US); Jithendra K Veeramachaneni, Redmond, WA (US); Keiji Kanazawa, Redmond, WA (US); Kitty L Leung, Redmond, WA (US); Mark A Gere, Redmond, WA (US); Shreedhar Madhavapeddi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 11/278,926

(22) Filed: Apr. 6, 2006

(65) Prior Publication Data

US 2007/0237154 A1    Oct. 11, 2007

(51) Int. Cl.
*H04L 12/66* (2006.01)

(52) U.S. Cl. .................. 370/352; 370/260; 370/428
(58) Field of Classification Search ................ 370/260, 370/351–356, 428
See application file for complete search history.

(56) References Cited

U.S. PATENT DOCUMENTS

| 6,005,859 | A  | * | 12/1999 | Harvell et al. ............... 370/352 |
| 6,968,367 | B1 | * | 11/2005 | Vassar et al. ................ 709/219 |
| 7,139,263 | B2 | * | 11/2006 | Miller et al. ................ 370/352 |
| 2003/0016657 | A1 | * | 1/2003 | Creamer et al. ............ 370/352 |
| 2003/0149774 | A1 | * | 8/2003 | McConnell et al. ......... 709/227 |

* cited by examiner

*Primary Examiner*—Suhan Ni
(74) *Attorney, Agent, or Firm*—Lee & Hayes, PLLC

(57) ABSTRACT

Instant messaging with audio connection formation is described. In an implementation, a method includes forming a communication to authenticate a client with a proxy during an instant messaging session and forming an invitation by the client for communication to the proxy that identifies another client, with which, to communicate via an audio connection. An acceptance is received from the other client via the proxy to form the audio connection.

17 Claims, 5 Drawing Sheets

INSTANT MESSAGING WITH AUDIO CONNECTION FORMATION

BACKGROUND

Varieties of techniques are continually provided to enable users to communicate, one with another, over the Internet. However, these techniques are typically provided through separate connections and services. For example, one such communication technique is instant messaging. Instant messaging typically provides techniques for users to communicate via text messages over the Internet in real time. Therefore, the users may communicate in a manner similar to a spoken conversation as if both users were located in the same room.

Another such communication technique involves the transfer of voice communication over the Internet, commonly referred to as Voice over Internet Protocol (i.e., "voice over IP" or "VoIP"). Voice over IP typically involves conversion of a voice input from a sender into packets for communication over the Internet, which are then reassembled and converted by a recipient to recreate the voice input. Therefore, voice over IP provides for communication of voice data over a packet-switched network as opposed to a traditional circuit-switched voice network used by a "plain old telephone service" (POTS).

When protocols for instant messaging are different from voice communications, however, connections which are used to perform instant messaging are traditionally provided separately from connections that were utilized to provide voice over IP. Therefore, traditional services that provided instant messaging and voice over IP created two connections for each user when logging on to the service. However, in some instances the user may not even use the voice over IP connection, and instead just use the instant messaging connection. Therefore, hardware, software and network resources which were used to provide the voice over IP connection were needlessly consumed by keeping the connection "open", resulting in a significant cost to both providers of the communication services as well as users of the services.

SUMMARY

Instant messaging with audio connection formation is described. In an implementation, techniques are described that, through execution of instructions on a client, form an instant messaging connection with an instant messaging service that does not include a Voice over Internet Protocol (VoIP) connection. When an input is received to communicate with another client via VoIP, the VoIP connection is initiated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Users are continually provided with ever increasing varieties of techniques to communicate over a network, such as through the use of instant messaging and Voice over Internet Protocol (hereinafter referred to as "voice over IP" or "VoIP"). Instant messaging typically provides techniques for users to communicate via text messages over the Internet in real time, such as in a manner similar to a spoken conversation. Voice over IP provides techniques for users to communicate using voice through the use of packets that are communicated over a packetized network, such as the Internet.

Traditional techniques that were used to provide both instant messaging and voice over IP, however, were resource intensive. One such technique, for instance, formed both an instant messaging connection and a voice over IP connection whenever the user logged on to a service, such as an instant messaging service. Therefore, whether the user wanted to communicate via instant message or voice, the corresponding connection was available. However, each user may not desire use of both instant messaging and voice each time the user logs on to the service. Therefore, this may result in the voice over IP connection being unused and resultant needless consumption of resources available to the user (e.g., the use of a client device) as well as the resources of the service provider. Further, this resource consumption may be greatly magnified by the numbers of users that may logon to the service at any one time.

Techniques are described, in which, instant messaging is provided with audio connection formation when desired such that the audio connection may be formed "on demand". For example, the techniques may provide for just-in-time registration for an audio connection during an instant messaging session when the audio communication is desired. Therefore, the audio connection is not formed until prompted by the user, thereby conserving resources available to the user as well as the service. Further discussion of these techniques may be found in relation to the following figures.

In the following discussion, an exemplary environment is first described that is operable to perform instant messaging with audio connection formation techniques. Exemplary procedures are then described which may be employed in the exemplary environment, as well as in other environments. Although the following discussion describes techniques that may be used to form an audio communication connection within a context of an instant messaging session, the techniques may be employed for a variety of other purposes, such as to federate different networks.

Exemplary Environment

Figure 1:
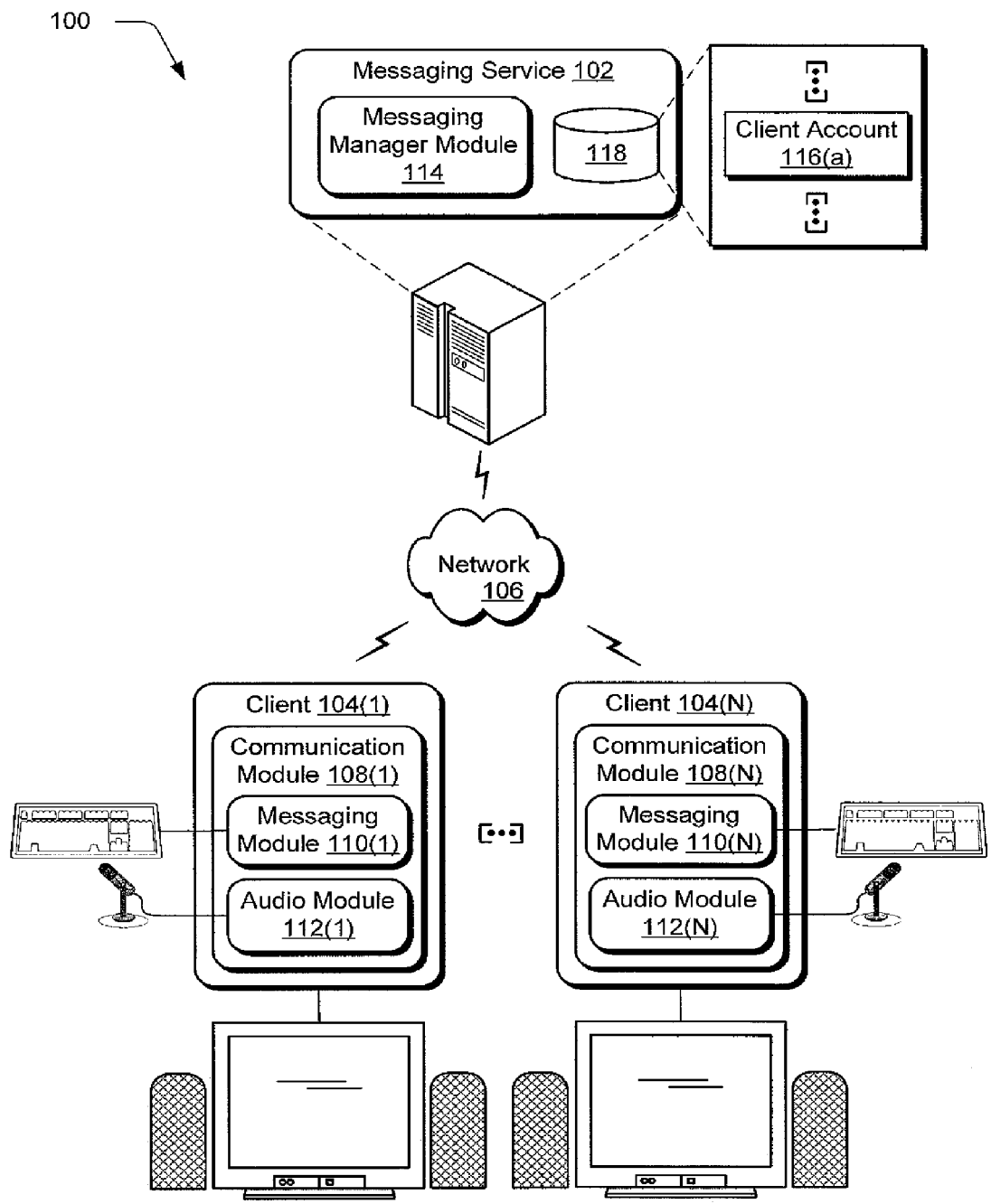
FIG. 1 is an illustration of an environment in an exemplary implementation that is operable to employ instant messaging with audio connection formation techniques.

FIG. 1 illustrates of an environment 100 in an exemplary implementation that is operable to employ techniques for instant messaging with audio connection formation. The illustrated environment 100 includes a messaging service 102 and a plurality of clients 104(1), ..., 104(N), that are communicatively coupled via a network 106. The clients 104(1)-104(N) may be configured in a variety of ways to access the network 106. For example, one or more of the clients 104(1)-104(N) may be configured as a computing device, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, one or more of the clients 104(1)-104(N) may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

Each of the plurality of clients 104(1)-104(N) is illustrated as including a respective one of a plurality of communication modules 108(1)-108(N). Further, each of the communication modules 108(1)-108(N) is illustrated as including a respective one of a plurality of messaging modules 110(1)-110(N) and respective one of a plurality of audio modules 112(1)-112(N).

Each messaging module 110(1)-110(N) is representative of functionality that is executable such that a respective client 104(1)-104(N) may communicate its presence information to the messaging service 102 and may participate in an instant messaging session with another one of the clients 104(1)-104(N). Instant messaging provides a mechanism such that each of the clients 104(1)-104(N), when participating in an instant messaging session, may send text messages to each other. The instant messages are typically communicated in real time, although delayed delivery may also be utilized, such as by logging the text messages when one of the clients 104(1)-104(N) is unavailable, e.g., offline. Thus, instant messaging may be thought of as a combination of e-mail and Internet chat in that instant messaging supports message exchange and is designed for two-way live chats. Therefore, instant messaging may be utilized for synchronous communication. For instance, like a typical spoken conversation, an instant messaging session may be performed in real-time such that each client 104(1)-104(N) may respond to each other client as the instant messages are received.

In an implementation, the messaging modules 110(1)-110(N) communicate with each other through use of the messaging service 102. Messaging service 102, for instance, may include a manager module 114 and client account 116(a) information, where "a" can be any integer from one to "A". The manager module 114 is executable to route instant messages between the messaging modules 110(1)-110(N). The manager module 114 is also executable to use the client account 116(a) information to authenticate the clients 104(1)-104(n), include billing information and so on. A variety of other functionality may also be provided by the manager module 114.

Client 104(1), for example, may cause the messaging module 110(1) to form an instant message for communication to client 104(N) (e.g., via inputs received from the illustrated keyboard) after the client 104(1) has been authenticated by the manager module 114 through use of respective client account 116(a) information. The messaging module 108(1) is executed to communicate the instant message to the messaging service 102, which then executes the manager module 114 to route the instant message to the client 104(N) over the network 106. The client 104(N) receives the instant message and executes the messaging module 110(N) to display the instant message, e.g., via the illustrated display device of FIG. 1.

The communication modules 108(1)-108(N) are also illustrated as including respective audio modules 112(1)-112(N). Each audio module 112(1)-112(N) is representative of functionality that is executable such that a respective client 104(1)-104(N) may communicate over the network 106 using audio. For example, the audio module 112(1) may receive a voice input via the illustrated microphone, packetize the voice input, and communicate the packets over the network 106 to the client 104(N). Client 104(N), through execution of the audio module 112(N) may reconstruct the voice input from the packets and output the voice input via the illustrated speakers. Likewise, client 104(N) may communicate back to the client 104(1) over the network 106 via audio module 112(N) with another voice input. In this way, clients 104(1)-104(N) may communicate back and forth using audio over the network 106.

As previously described, traditional techniques used to provide an instant messaging session and voice over IP communication within the context of the instant messaging session required creation of an instant messaging connection and a voice over IP connection when the client logged on to the messaging service. Therefore, both connections were formed regardless of whether use of the connections by the clients was intended, which resulted in needless consumption of resources.

Accordingly, the communication modules 108(1)-108(N) are configured to initiate an audio connection (e.g., a voice over IP connection) "on demand", such as within a context of an instant messaging session. Client 104(1), for instance, may receive a request while logged on to the messaging service 102 that specifies another client (e.g., client 104(N)), with which, to communicate via voice. Accordingly, an audio connection may be initiated in response to the request such that the clients 104(1)-104(N) may communicate, one to another, via a voice over IP connection. Therefore, resources used by the clients 104(1)-104(N), network 106 and messaging service 102 are not committed until use of the connection is desired, thereby resulting in efficient use of the resources. Further discussion of a system which may be employed to form the audio connection may be found in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the instant messaging with audio connection formation techniques described below are platform-independent, meaning that the techniques may be implemented on a variety of commercial computing platforms having a variety of processors.

Figure 2:
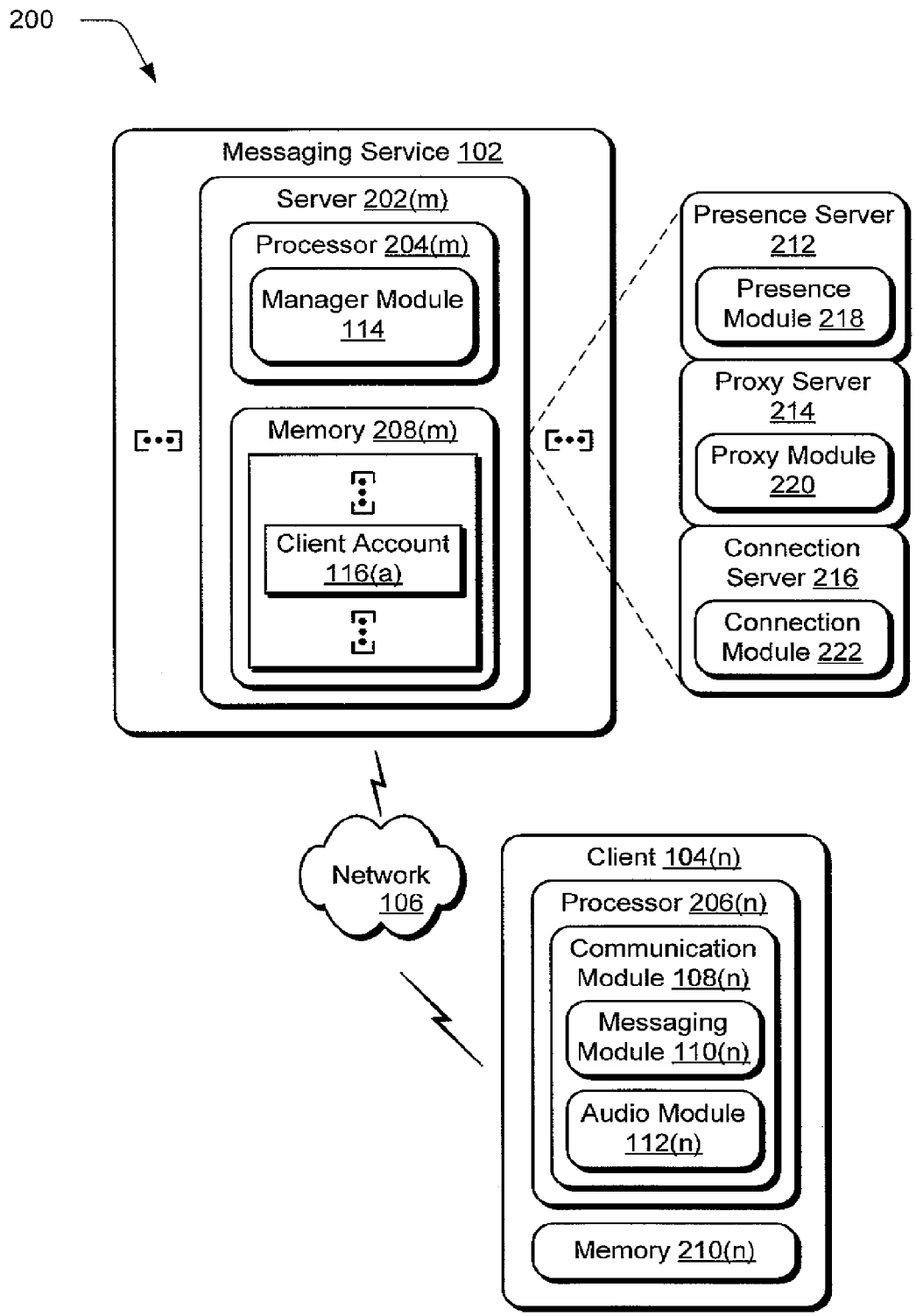
FIG. 2 is an illustration of a system in an exemplary implementation showing a messaging service and client of FIG. 1 in greater detail.

FIG. 2 is an illustration of a system 200 in an exemplary implementation showing the messaging service 102 and a client 104(n) of FIG. 1 in greater detail. The messaging service 202 is illustrated as being implemented by a plurality of servers 202(m) (where "m" can be any integer from one to "M") and the client 104(n) is illustrated as a client device, which may be representative of any one of the clients 104(1)-104(N) of FIG. 1. Accordingly, the servers 202(m) and the clients 104(n) include respective processors 204(m), 206(n) and respective memory 208(m), 210(n).

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(m), 210(n) is shown, respectively, for the server 202(m) and the client 104(n), a wide variety of types and combinations of memory may be employed, such as random access memory (RAM), hard disk memory, removable medium memory, and other types of computer-readable media.

The client 104(n) is illustrated as executing the communication module 108, and its included messaging and audio modules 110(n), 112(n), on the processor 206(n), which is also storable in memory 210(n). As previously described, the communication module 108(n) may be configured to create an instant messaging connection by logging on to the messaging service 102 without forming an audio connection, such as for the communication of packetized audio data. The communication module 108(n) may also be configured to initiate an audio connection on demand that is configured for real time communication of streaming audio between clients, e.g., clients 104(1)-104(N) of FIG. 1, through communication with the messaging service 102 to initiate the connection.

The messaging service 102 is illustrated as executing the messaging manager module 114 on the processor 204(m), which is also storable in memory 208(m). The client account 116(a) information is illustrated as being stored in memory 208(m), i.e., the memory 208(m) implements the storage 118 of FIG. 1. Functionality of the messaging manager module 114 and the servers 202(m) may be implemented in a variety of ways to provide separate initiation of instant messaging and audio connections.

The servers 202(m), for instance, may include a presence server 212, a proxy server 214 and a connection server 216, which are illustrated as executing a presence module 218, proxy module 220 and connection module 222, respectively. It should be apparent that although a single presence server 212, proxy server 214 and connection server 216 are illustrated, these servers may be representative of multiple servers. Accordingly, in the following discussion, reference may be made singly (e.g., the connection server 216) and/or plural (e.g., the connection servers 216).

The presence server 212, through execution of the presence module 218, acts as a "back end" of the messaging service 102 which tracks presence of each of the clients 104(n), such as whether the clients 104(n) are logged on the messaging service 102, how the clients 104(n) are logged on, and so on. For example, the clients 104(n) may connect to different connection servers 216 (e.g., through execution of the connection module 222) when logging on to the messaging service 102. The presence server 212, through execution of the presence module 218, may track which of the clients 104(n) are connected to which of the connection servers 216, whether the clients are logged on, and so on. A variety of other examples are also contemplated.

The proxy server 214, through execution of the proxy module, is configured to establish and negotiate an audio connection for use in an audio session. For example, the proxy server 214 may be configured to act as an intermediary server that proxies messages (e.g., session initiation protocol (SIP) messages) between two or more clients 104(1)-104(N) to form an audio connection. Thus, rather than pre-register with the proxy at logon, the clients 104(n) may connect to the proxy on an as needed basis when desired by the clients 104(n). Therefore, the additional overhead of maintaining multiple connections is not avoided until the multiple connections are desired. Further discussion of use of the proxy may be found in relation to FIGS. 4-5.

Exemplary Procedures

The following discussion describes audio connection formation techniques within a context of instant messaging that may be implemented utilizing the previously described systems and devices. Aspects of each of the procedures may be implemented in hardware, firmware, or software, or a combination thereof The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
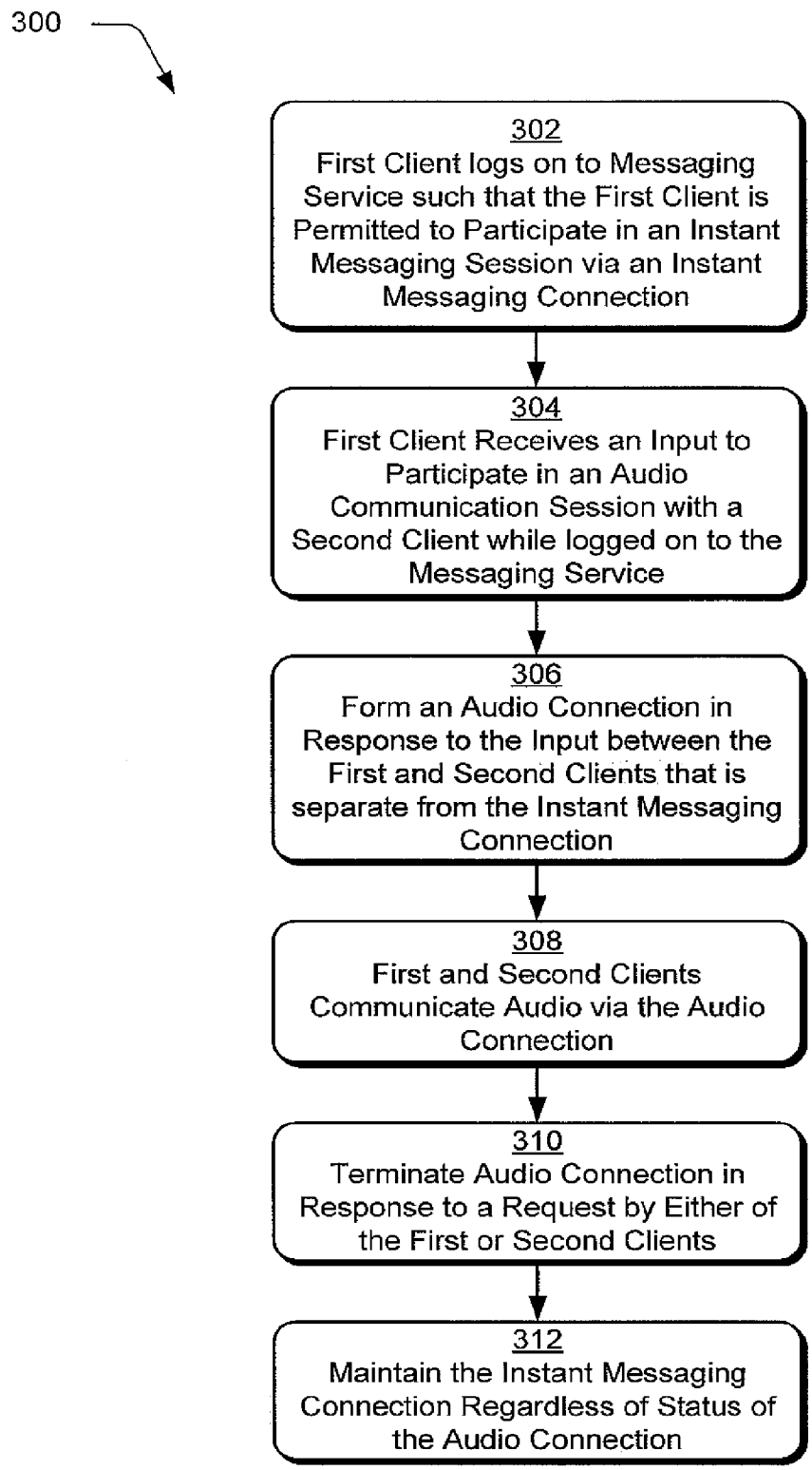
FIG. 3 is a flow diagram depicting a procedure in an exemplary implementation in which an audio connection is created when requested by a client to communicate with another client.

FIG. 3 depicts a procedure 300 in an exemplary implementation in which an audio connection is created when requested by a client to communicate with another client. A first client logs on to a messaging service such that the first client is permitted to participate in an instant messaging session via an instant messaging connection (block 302). Client 104(1), for instance, may log on to the messaging service 102 and accordingly form an instant messaging connection between the client 104(1) and the service 102, such as by providing client credentials. At this point, the instant messaging connection is formed without forming another communication connection.

The first client receives an input to participate in an audio communication session with a second client while logged on to the messaging service (block 304). Client 104(1), for example, may be participating in an instant messaging session with client 104(N) over the network 106 and select an option from an instant messaging user interface to communicate with the client 104(N) using voice. In another example, client 104(1) may be logged on to the message service 102 and notice that client 104(N) just logged on, and therefore select the option to communication with the client 104(N) using voice without previously sending an instant message to the client. A variety of other examples are also contemplated without departing from the spirit and scope thereof.

An audio connection is formed, in response to the input, between the first and second clients that is separate from the instant messaging connection (block 306). The audio connection, for instance, may involve different protocols and resources (e.g., at the messaging service and/or the clients 104(1)-104(N)), at least in part, than the instant messaging connection.

The audio connection may be formed in a variety of ways. For example, the clients 104(1)-104(N) may communicate through the messaging service to initiate the audio connection but then communicate directly using the audio connection, such as via a peer-to-peer connection. In another example, the clients 104(1)-104(N) may communicate indirectly through the messaging service and/or another stand-alone service after initiation through the messaging service 102. A variety of other examples are also contemplated, such as by forming the audio connection through use of a proxy, further discussion of which may be found in relation to FIGS. 4-5.

The first and second clients may then communicate audio via the audio connection (block 308), such as to communicate via voice over IP. Further, the audio connection may be terminated in response to a request by either of the first or second clients (block 310) and the instant messaging connection may be maintained regardless of the status of the audio connection (block 312). Thus, the audio connection is maintained "on demand" separately from the instant messaging connection, thereby providing for efficient use of resources.

Figure 4:
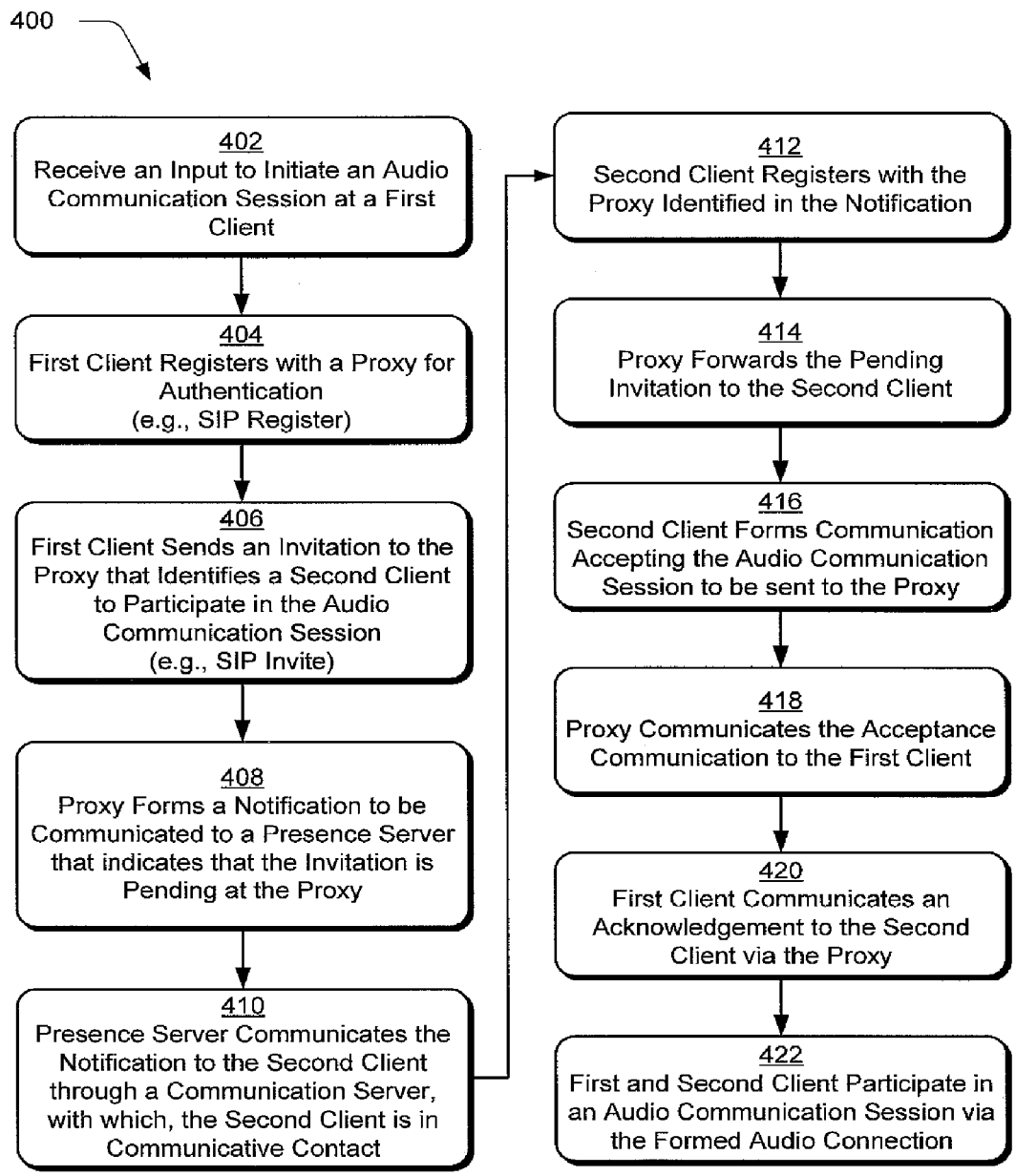
FIG. 4 is a flow diagram depicting a procedure in an exemplary implementation in which a session initiation protocol (SIP) proxy is used to form an audio connection in a context of an instant messaging session.
Figure 5:
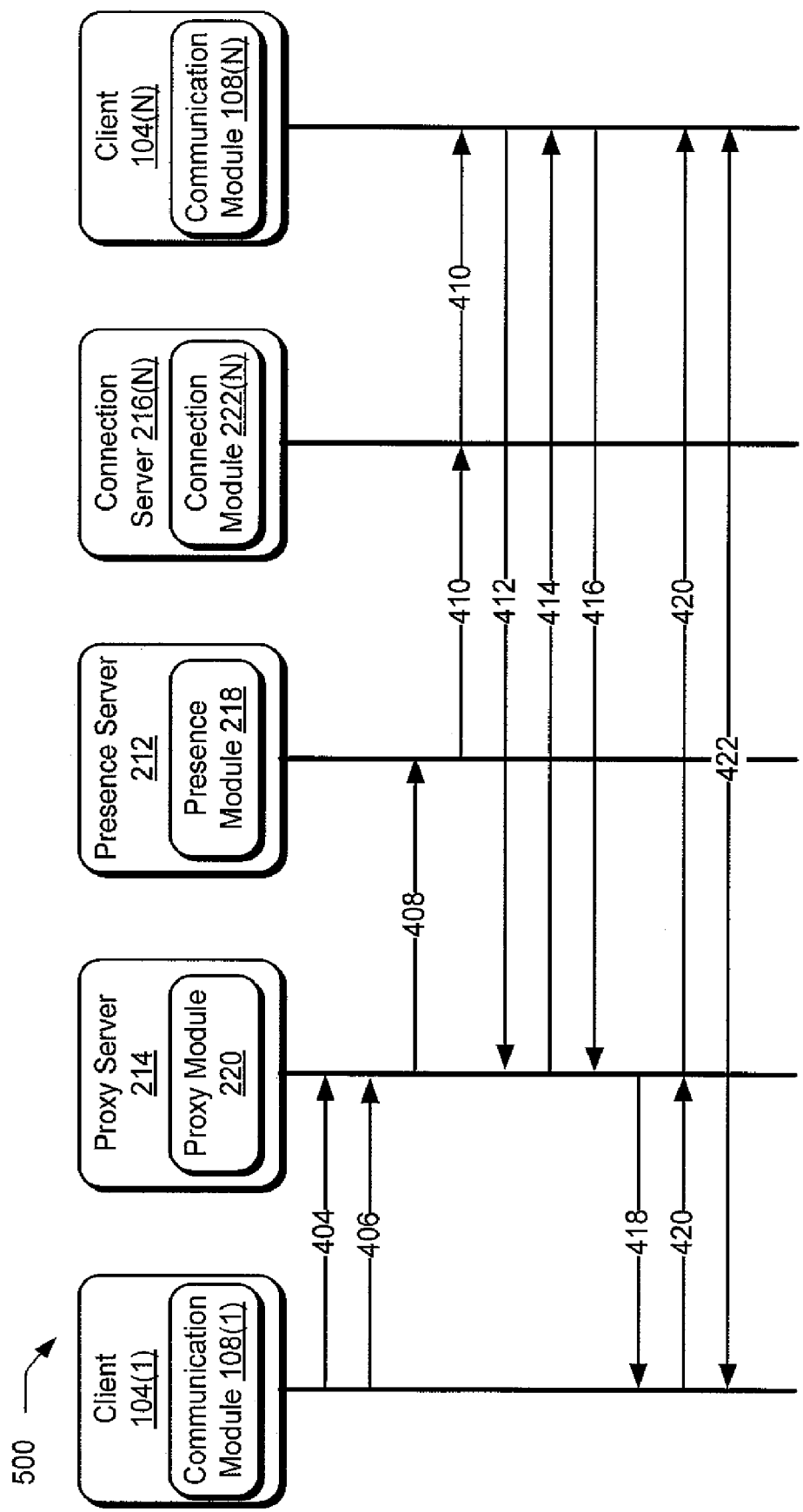
FIG. 5 is an illustration of a system that includes a proxy server, presence server, connection server and clients of FIG. 2 as implementing the procedure of FIG. 4

FIG. 4 depicts a procedure 400 in an exemplary implementation in which a session initiation protocol (SIP) proxy is used to form an audio connection in a context of an instant messaging session. During the discussion of FIG. 4, reference will also be made to the system 500 of FIG. 5.

An input is received to initiate an audio communication session at a first client (block 402). The input, for instance, may be originated through use of an instant messaging user interface output by client 104(1), through a stand-alone module that does not involve instant messaging, and so on.

The first client registers with a proxy for authentication (block 404). Client 104(1), for instance, may provide sign-in credentials (e.g., name and password) to the proxy server 214 for authentication, which may be performed by the proxy server 214 itself (e.g., through client account 116(*a*) information) or a stand-alone authentication that is communicatively coupled to the proxy server 214. Registration may be performed using a variety of techniques, such as through a session initiation protocol (SIP) request.

The first client sends an invitation to the proxy that identifies a second client to participate in the audio communication session (block 406). Client 104(1), for instance, may also send an invitation that complies with the SIP to the proxy server 214.

In response to receipt of the invitation, the proxy forms a notification to be communicated to a presence server that indicates that the invitation is pending at the proxy (block 408). The notification, for instance, may indicate that a particular client (e.g., client 104(N)) is to contact the proxy server 214, but does not include the invitation itself. Rather, the notification may simply include a network address of the proxy server 214. In this way, the invitation may be "parked" at the proxy server 214 without communicating the invitation through the presence server 212. A variety of other examples are also contemplated.

The presence server communicates the notification to the second client through a communication server, with which, the second client is in communicative contact (block 410). The client 104(N), for instance, may connect to any one of a plurality of connection servers 216 to access the messaging service 102. Therefore, the presence server 212 may monitor presence of the client 104(N) in relation to the messaging service 102, such as which of the connection servers (e.g., connection server 216(N)) the client 104(N) is using to access the messaging service 102, status of the client 104(N) (e.g., "online", "offline", "busy", "away"), and so on. Therefore, the presence server 212, through execution of the present module 218, may locate the client 104(N) and its corresponding connection server 216(N) and forward the notification to the client 104(N) through the connection server 216(N).

Upon receipt of the notification, the second client registers with the proxy identified in the notification (block 412). Client 104(N), for instance, may send a name and password to the proxy server 214. The proxy server, upon registering the client 104(N), forwards the pending invitation to the second client (block 414), e.g., client 104(N).

The second client, when accepting the audio communication session, forms an acceptance communication to be sent to the proxy (block 416), which is sent by the proxy to the first client (block 418), e.g., client 104(1). The first client communicates an acknowledgement to the second client via the proxy (block 420), after which, the first and second client participate in an audio communication session via the formed audio connection (block 422). Thus, instead of requiring clients to pre-register with the proxy (e.g., the proxy server 214 and proxy module 220), just-in-time registration mechanism may be employed where the clients connect to a proxy (which in this example was an SIP proxy) when the audio connection is desired, such that persistent audio connections are not needed for the duration of a login. Other participants are then notified of how to connect to the chosen proxy. Thus, in this example, multiple proxy servers may be provided to a multitude of clients and the clients may locate a corresponding proxy server through use of the notifications. A variety of other examples are also contemplated.

Although the previous procedures describe a "two-party" scenario for the sake of clarity in the discussion, it should be readily apparent that "multiparty" scenarios are also contemplated, as well as "multi-session" and "multi-presence" scenarios.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   forming a communication to authenticate a client with a proxy during an instant messaging session;
   forming an invitation by the client for communication to the proxy that identifies another client with which to communicate via an audio connection;
   storing the invitation at the proxy;
   forming a notification at the proxy to be communicated to the other client that causes the other client to contact the proxy;
   registering with the proxy by the another client to authenticate the other client;
   forwarding the stored invitation to the other client when registered with the proxy; and
   receiving an acceptance from the other client via the proxy to form the audio connection, wherein at least a portion of the method is implemented in hardware.

2. A method as described in claim 1, wherein:
   the audio connection is a Voice over Internet Protocol (VoIP) connection; and
   the communication and the invitation comply with a Session Initiation Protocol (SIP).

3. A method as described in claim 1, wherein the audio connection is configured to communicate streaming audio back and forth between the client and the other client in real time.

4. A method as described in claim 1, further comprising forwarding the stored invitation when the other client contacts the proxy, wherein the stored invitation identifies the client that formed the invitation.

5. A method as described in claim 1, wherein:

when the invitation is received at the proxy, the proxy does not have a network address of the other client; and the notification is formed for communication to a presence server that is configured to locate the other client.

6. A method as described in claim 5, wherein the notification is communicated to the other client from the presence server via a communication server.

7. A method as described in claim 6, wherein the other client is communicatively coupled to the communication server to perform instant messaging.

8. A method comprising:

when an invitation is received to form a real-time audio connection between first and second clients at a proxy from the first client:

storing the invitation at the proxy;

forming a notification to be communicated to the second client that specifies a network address of the proxy that requests the second client to contact the proxy; and when the second client contacts the proxy:

registering the second client with the proxy to authenticate the second client;

forwarding the stored invitation to the second client when registered with the proxy; and receiving an acceptance from the second client via the proxy to form the real-time audio connection, wherein at least a portion of the method is implemented in hardware.

9. A method as described in claim 8, wherein the invitation is received while the first client is already logged on to a messaging service that provides communication of instant messages.

10. A method as described in claim 8, wherein the real-time audio connection is a Voice over Internet Protocol (VoIP) connection.

11. A method as described in claim 8, wherein:

when the invitation is received at the proxy, the proxy does not have a network address of the second client; and the notification is formed for communication to a presence server that is configured to locate the network address of the second client and to communicate the notification to the second client.

12. A method as described in claim 11, wherein the notification does not specify that the audio connection is to be formed.

13. A method as described in claim 8, wherein the invitation is configured such that the second client may respond to the invitation to participate in the audio connection.

14. A method as described in claim 8, wherein the audio connection is further configured to communicate video.

15. One or more computer-readable memory device comprising executable instruction that, when executed, direct a client to perform a method, the method comprising:

form an instant messaging connection, with an instant messaging service, that does not include a Voice over Internet Protocol (VoIP) connection; and when an input is received to communicate with another client via VoIP:

forming a communication to authenticate the client with a proxy;

forming an invitation by the client for communication to the proxy that identifies the another client with which to communicate via VoIP;

storing the invitation at the proxy;

forming a notification at the proxy to be communicated to the another client that causes the another client to contact the proxy;

registering with the proxy by the another client to authenticate the another client;

forwarding the stored invitation to the another client when registered with the proxy; and receiving an acceptance from the another client via the proxy to form a connection which enables communication via VoIP.

16. One or more computer-readable memory device as described in claim 15, wherein the input is received while the instant messaging connection is formed.

17. One or more computer-readable memory device as described in claim 15, wherein the input is received while the client is logged in to the instant messaging service.

* * * * *